(12) United States Patent
Zhao et al.

(10) Patent No.: US 10,828,730 B2
(45) Date of Patent: Nov. 10, 2020

(54) TEMPERED VACUUM GLASS

(71) Applicant: LUOYANG LANDGLASS TECHNOLOGY CO., LTD., Luoyang (CN)

(72) Inventors: Yan Zhao, Luoyang (CN); Yanbing Li, Luoyang (CN); Xiping Liang, Luoyang (CN); Suzhen Li, Luoyang (CN)

(73) Assignee: LUOYANG LANDGLASS TECHNOLOGY CO., LTD., Luoyang (CN)

( * ) Notice: Subject to any disclaimer, the term of this patent is extended or adjusted under 35 U.S.C. 154(b) by 73 days.

(21) Appl. No.: 16/314,895

(22) PCT Filed: Sep. 12, 2016

(86) PCT No.: PCT/CN2016/098710
§ 371 (c)(1),
(2) Date: Jan. 3, 2019

(87) PCT Pub. No.: WO2018/006493
PCT Pub. Date: Jan. 11, 2018

(65) Prior Publication Data
US 2019/0308279 A1     Oct. 10, 2019

(30) Foreign Application Priority Data

Jul. 5, 2016  (CN) .......................... 2016 1 05214400

(51) Int. Cl.
*B23K 35/00* (2006.01)
*B22F 3/00* (2006.01)
(Continued)

(52) U.S. Cl.
CPC ............ *B23K 35/001* (2013.01); *B22F 3/002* (2013.01); *C03C 27/08* (2013.01); *B23K 35/262* (2013.01);
(Continued)

(58) Field of Classification Search
CPC .............. E06B 3/6612; E06B 3/66357; E06B 3/67334; Y02B 80/24; Y02A 30/25
See application file for complete search history.

(56) References Cited

U.S. PATENT DOCUMENTS

| | | |
|---|---|---|
| 4,562,121 A | 12/1985 | Thiemann et al. |
| 2011/0139857 A1* | 6/2011 | Hagen ................... C03C 27/044 |
| | | 228/175 |

(Continued)

FOREIGN PATENT DOCUMENTS

| | | |
|---|---|---|
| CN | 102249559 A | 11/2011 |
| CN | 203159439 U | 8/2013 |

(Continued)

OTHER PUBLICATIONS

International Search Report dated Mar. 14, 2017, issued in corresponding International Patent Application No. PCT/CN2016/098710.

(Continued)

*Primary Examiner* — Donald J Loney
(74) *Attorney, Agent, or Firm* — Morgan, Lewis & Bockius LLP

(57) ABSTRACT

The disclosure describes a tempered vacuum glass, which comprises: at least two glass sheets arranged parallel to each other; surrounding edges of adjacent glass sheets being sealed using an edge sealing structure; and support members placed in an array between the adjacent glass sheets to form a vacuum space. The edge sealing structure is a metallic edge-sealing structure. The structure comprises a first transition layer, a first metallized layer, a first intermetallic compound layer, a solder layer, a second intermetallic compound layer, a second metallized layer, and a second transition layer stacked in that order. The first and second metallized layers are in a spongy skeleton structure formed by sintering a metal paste. The first and second transition (Continued)

layers are formed by sintering the metal paste on the adjacent glass sheets, and contain a glass phase layer including metallic particles and a metal oxide layer with a net structure.

9 Claims, 3 Drawing Sheets

(51) Int. Cl.
    *C03C 27/08*     (2006.01)
    *B60J 10/777*     (2016.01)
    *B23K 35/26*     (2006.01)
    *E06B 3/663*     (2006.01)
    *E06B 3/673*     (2006.01)

(52) U.S. Cl.
    CPC ......... *B60J 10/777* (2016.02); *E06B 3/66357* (2013.01); *E06B 3/67334* (2013.01)

(56) References Cited

U.S. PATENT DOCUMENTS

2014/0050867 A1     2/2014   Zhao et al.
2015/0300077 A1*  10/2015  Veerasamy ......... E06B 3/66357
                                                  428/34

FOREIGN PATENT DOCUMENTS

CN         104003628 A     8/2014
CN         105906222 A     8/2016

OTHER PUBLICATIONS

Written Opinion dated Mar. 14, 2017, issued in corresponding International Patent Application No. PCT/CN2016/098710.

* cited by examiner

Metallized Layer    Transition Layer

Solder Layer    Intermetallic Compound Layer

TEMPERED VACUUM GLASS

CLAIM FOR PRIORITY

This application is a U.S. national phase entry under 35 U.S.C. § 371 from PCT International Application No. PCT/CN2016/098710 filed on Sep. 12, 2016, which is based upon and claims the benefit of priority from the prior Chinese Patent Application No. 201610521440.0 filed on Jul. 5, 2016. The entire contents of the above applications are incorporated herein by reference.

TECHNICAL FIELD

This present disclosure relates to the tempered vacuum glass.

BACKGROUND TECHNOLOGY

The vacuum glass, as a new generation of energy-saving and environment-friendly glass, has promising application prospects in the field of new energy development and utilization as well as energy conservation because of its excellent properties of light transmission, thermal insulation, sound insulation and heat preservation. A vacuum glass comprises two or more pieces of glass airtightly sealed using sealants. The reliability of the sealants directly affects the usability and service life of the vacuum glass.

The vacuum glass products generally use low melting-point glass powder for the sealing of the vacuum glass, with the sealing temperature commonly within 420-450° C. This not only consumes a large amount of energy, but also limits the application of tempering technology in the vacuum glass. In addition, the vacuum glass produced by using other organic materials as edge-sealing materials is poor in mechanical performance, durability and weathering resistance, greatly shortening the service life of the vacuum glass.

SUMMARY OF THE DISCLOSURE

The present disclosure provides a tempered vacuum glass, which provides the advantages of a tempered glass and a vacuum glass and ensures the air tightness, mechanical performance, durability and weathering resistance of edge-sealing structure of the vacuum glass.

The embodiment of this present disclosure provides a tempered vacuum glass, comprising at least two glass sheets arranged parallel to each other. At least one of the glass sheets is tempered. Sides of adjacent glass sheets are sealed using an edge sealing structure. Support members are disposed in an array between the glass sheets to form a vacuum space. The edge sealing structure is a metallic edge-sealing structure formed by using a metal to seal and connect the sides of adjacent glass sheets. The edge sealing structure comprises a transition layer, metallized layer, intermetallic compound layer, solder layer, intermetallic compound layer, metallized layer and transition layer stacked in that order. The metallized layer has a sponge scaffold structure formed by sintering a metal paste. A solder is then melted to fill pores of the sponge scaffold structure of an adjacent metallized layer to form the intermetallic compound layer.

For example, said solder layer is formed through the melting of low-temperature solder containing tin, which is the combination of tin and one or more transition metals, rare metals, or precious metals.

Further, materials of said solder layer are Sn—Ag—Cu, Sn—Au, Sn—Pb, Sn—Ag, Sn—Cu, Sn—Zn, Sn—Bi, Sn—Sb, Sn—Ag—Cu—Bi, Sn—Ag—Bi—In—Ti, Sn—Ag—Bi—In, Sn—Ag—Cu—In—Ti or Sn—Ag—Bi—Cu—In—Ti alloy.

For example, said metal paste is the silver paste, silver-coated copper paste or silver-coated nickel paste, which contains one or more rare metals, transition metals or precious metals.

For example, the joint surface of said intermetallic compound layer and solder layer is a tooth surface.

Further, said intermetallic compound layer contains one of or a combination of $Ag_3Sn$, $AgZn$, or $In_3Sn$.

For example, said metallized layer contains about 3-10% of glass phase.

For example, said transition layer is formed by sintering a metal paste on glass sheets and contains the glass phase layer including metallic particles, and metallic oxide layer with net structure.

For example, at least one of the glass sheets is set with a pump-out hole, and cap liner that is used to seal the pump-out hole.

For example, said outer sides of the edge sealing structure are set with secondary peripheral sealing structure including sealant, resin or plastic.

For example, there exists no clear boundary between layers, which are mutually inclusive. The metal paste in this present disclosure comprises conductive phase, glass powder and organic additives.

For example, the transition layer contains the glass phase sintered with glass sheets and included the metallic particles, where the skeleton of metallic particles contains oxide phase. That is, the metallic particles oxidize in high temperature—the glass phase in silver paste melts to soak the silver particle surface—silver oxide dissolves in the glass phase—the glass phase containing silver oxide penetrates into the glass surface.

This present disclosure may have beneficial technical effects as follows: 1. The metallized layer contains the glass phase, which is at the bottom of the metallized layer under capillary pressure and sinters the metallized layer of a sponge scaffold structure with sheets in the process of sintering. The glass phase layer including metallic particles is called metallic transition layer. The metallized layer in this present disclosure has two transition layers, of which one is the metal transition layer describing the relationship between the metallized layer and sheets; and the other is the metallic oxide transition layer with net structure describing the relationship between the metal and glass phase, which are mutually inclusive integrated structure formed through synchronous sintering. The transition layer has strong adhesion force and sound thermal shock resistance. The solder can be cooled quickly after soldering, avoiding silver corrosion.

2. The intermetallic compound layer in this present disclosure is a tooth surface layer. The solder fills the pores of the sponge scaffold structure, that is, the solder soaks the top region of the metallized layer not yet being wrapped by glass phase to realize airtight sealing. The solder forms a tooth bond to firmly anchor the metallized layers on the upper and lower sheets to ensure more solid and reliable sealant with better air tightness.

3. Compared with the existing technology, the edge sealing structure in this present disclosure can satisfy airtight requirements and adapt well to the stress generated during the use of the vacuum glass, with better mechanical performance, which can ensure the stability and safety of the tempered vacuum glass in use.

REFERENCE SIGNS

1. Glass sheets, 2. Edge sealing structure, 3. Support members, 4. Pump-out hole, 5. Cap liner, 6. Secondary peripheral sealing structure.

DETAILED DESCRIPTION OF THE PREFERRED EMBODIMENTS

Now specific embodiments will be presented here to further explain the tempered vacuum glass provided in the embodiments of this present disclosure, so as to make a person having ordinary skill in the art better understand the disclosed invention and implement. Yet the specific embodiments do not in any way serve as limitations to the disclosed invention.

Figure 1:
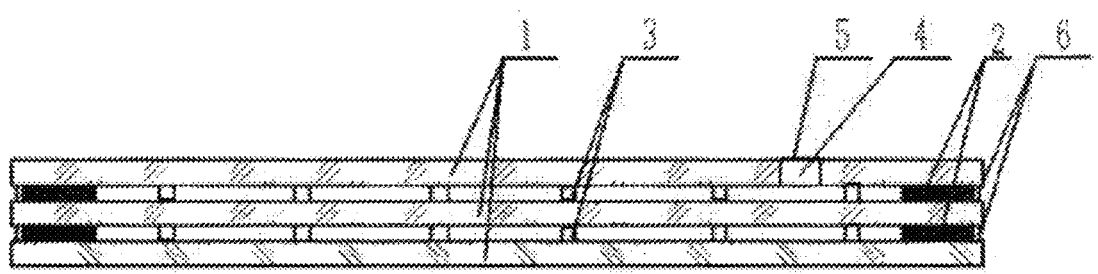
FIG. 1 is a structure schematic of an exemplary tempered vacuum glass provided in the embodiments of this present disclosure.

As FIG. 1 shows, the embodiment of this present disclosure provides an exemplary tempered vacuum glass, comprising at least two glass sheets 1 arranged parallel to each other. At least one of the glass sheets 1 is tempered. A vacuum space is formed by sealing the sides of adjacent glass sheets 1 with edge sealing structure 2, and setting array of support members 3 in the middle of the adjacent glass sheets 1. Secondary peripheral sealing structure 6 including sealant, resin or plastic is set on outer sides of edge sealing structure 2 of the adjacent glass sheets 1. Among that, edge sealing structure 2 is a metallic edge-sealing structure formed through metal sealing on the sides of adjacent glass sheets 1. Said metal sealing methods include laser heating or induction heating, where local high temperature is used to melt the alloy materials comprising tin to prevent the annealing of tempered glass. Said metal sealing temperature is not higher than 250° C. The vacuum glass can be composited with hollow sheets, laminated sheets, and other types of sheets. Materials of support members can be inorganic materials, such as metal, glass, or ceramic. At least one of the glass sheets 1 is set with a pump-out hole 4, and cap liner 5 that is used to seal a pump-out hole 4. Among which, pump-out hole 4 is sealed with metal sheet.

Figure 5:
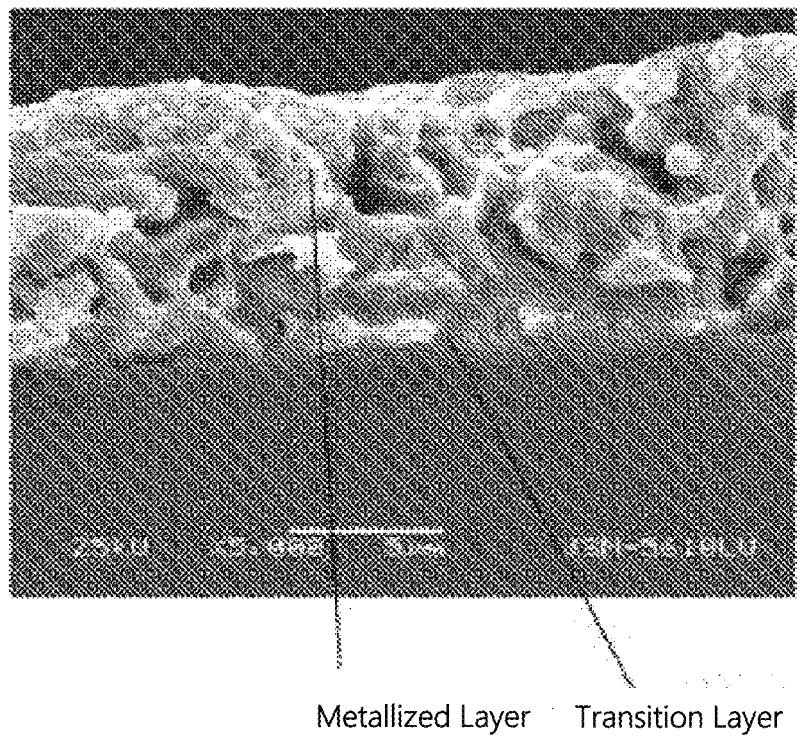
FIGS. 5 and 6 are the microscopic views of a metallographic structure of an exemplary edge sealing structure.
Figure 6:
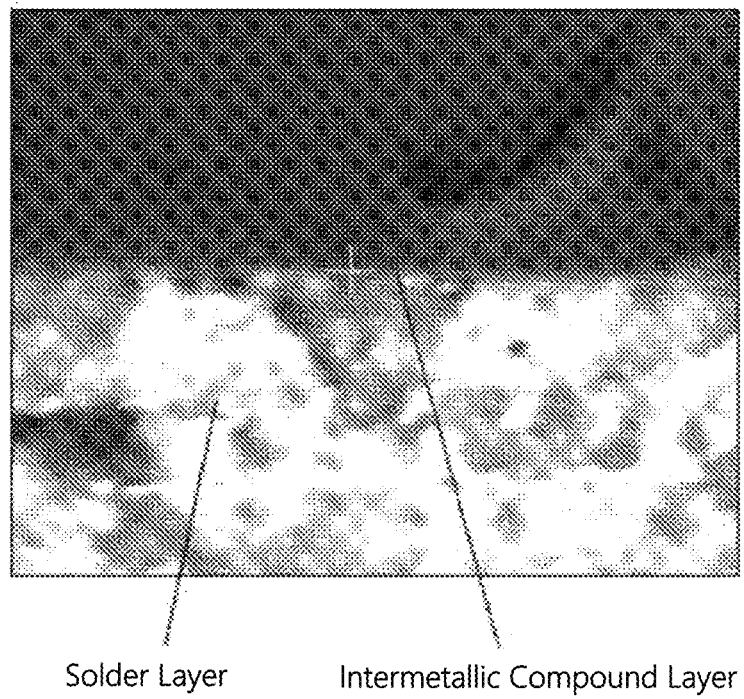

The edge sealing structure 2 of this present disclosure comprises a transition layer, a metallized layer, an intermetallic compound layer, a solder layer, an intermetallic compound layer, a metallized layer, and a transition layer stacked in that order. No clear boundary exists between layers, which are mutually inclusive. Among which, as FIGS. 5 and 6 show, the metallized layer is a spongy skeleton structure formed through sintering of a metal paste. After heating, solder in the solder layer is melt to fill in pores of the spongy skeleton structure on the metallized layers' surfaces adjacent to the solder layer, and to form the intermetallic compound layer. The metal paste is silver paste, silver-coated copper paste, or silver-coated nickel paste. The silver paste, silver-coated copper paste, or silver-coated nickel paste contain one or more rare metals, transition metals, or precious metals. The solder layer is formed through the melting of low-temperature solder containing tin. The low-temperature solder containing tin is the combination of tin and one or more transition metals, rare metals, or precious metals. Materials of the solder layer is Sn—Ag—Cu, Sn—Au, Sn—Pb, Sn—Ag, Sn—Cu, Sn—Zn, Sn—Bi, Sn—Sb, Sn—Ag—Cu—Bi, Sn—Ag—Bi—In—Ti, Sn—Ag—Bi—In, Sn—Ag—Cu—In—Ti, or Sn—Ag—Bi—Cu—In—Ti alloy.

The joint surface of said intermetallic compound layer and solder layer is a tooth surface. The intermetallic compound layer contains one of or the combination of $Ag_3Sn$, AgZn, and $In_3Sn$. Said metallized layer contains about 3-10% of glass phase. The solder soaks the region of the metallized layer not yet being wrapped by glass phase to realize airtight sealing.

Said transition layer is formed by sintering a metal paste on glass sheets 1, and contains the glass phase layer including metallic particles inside and metallic oxide layer with net structure.

Embodiment 1

Figure 2:
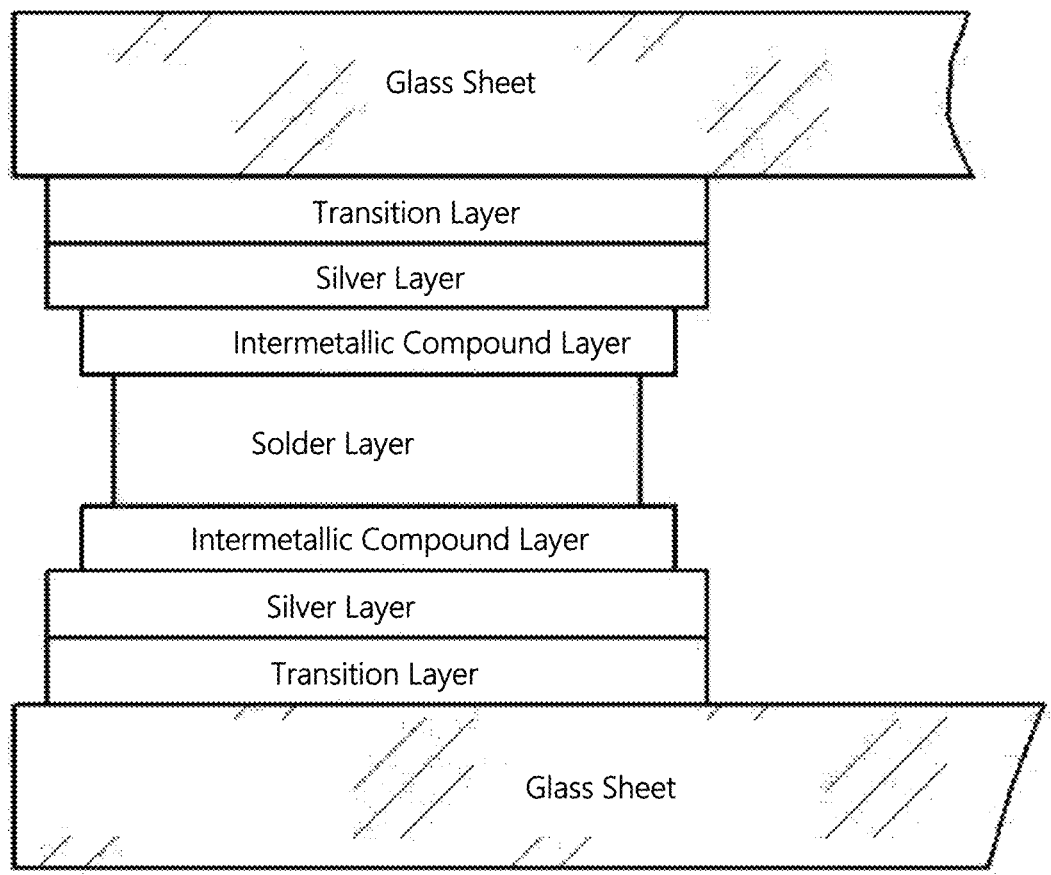
FIG. 2 is a schematic diagram of an exemplary Embodiment 1.

As FIG. 2 shows, an exemplary edge sealing structure 2 in an exemplary embodiment comprises a transition layer, silver layer, intermetallic compound layer, solder layer, intermetallic compound layer, silver layer, and transition layer stacked in that order. In some embodiments, the metallized layers are spongy skeleton structure formed through the sintering of metal paste, which is silver paste. Besides, the solder layer is low-temperature solder containing tin, which is the combination of tin and transition metal, and of tin and precious metal. Materials of the solder layer are Sn—Cu, Sn—Zn, Sn—Ag—Cu, Sn—Ag, or Sn—Au.

The intermetallic compound layer is a tooth surface layer formed through the reaction between solder layer and silver layer. The rugged tooth surface layer ensures that the silver layer and solder are combined more firmly. The solder is filled in the pores of the spongy skeleton structure of silver layer, rendering better air tightness. The intermetallic compound layer contains $Ag_3Sn$ or AgZn, or a combination of different kinds of intermetallic compound. The silver layer contains about 5-10% of glass phase. The solder soaks the region of the silver layer not yet being wrapped by glass phase to realize airtight sealing.

The transition layer shown in FIG. 2 is formed through the sintering of silver paste on glass sheets. The transition layer contains metal transition layer wrapping silver particles and silver oxide transition layer with net structure. In the process of sintering, silver paste is sintered with glass sheets under capillary pressure. A transition layer comprises metal transition layer wrapping silver particles and silver oxide layer with net structure, which are mutually inclusive integrated structure formed through synchronous sintering. The transition layer has strong adhesion force and sound thermal shock resistance. Solder can be cooled quickly after soldering.

Embodiment 2

Figure 3:
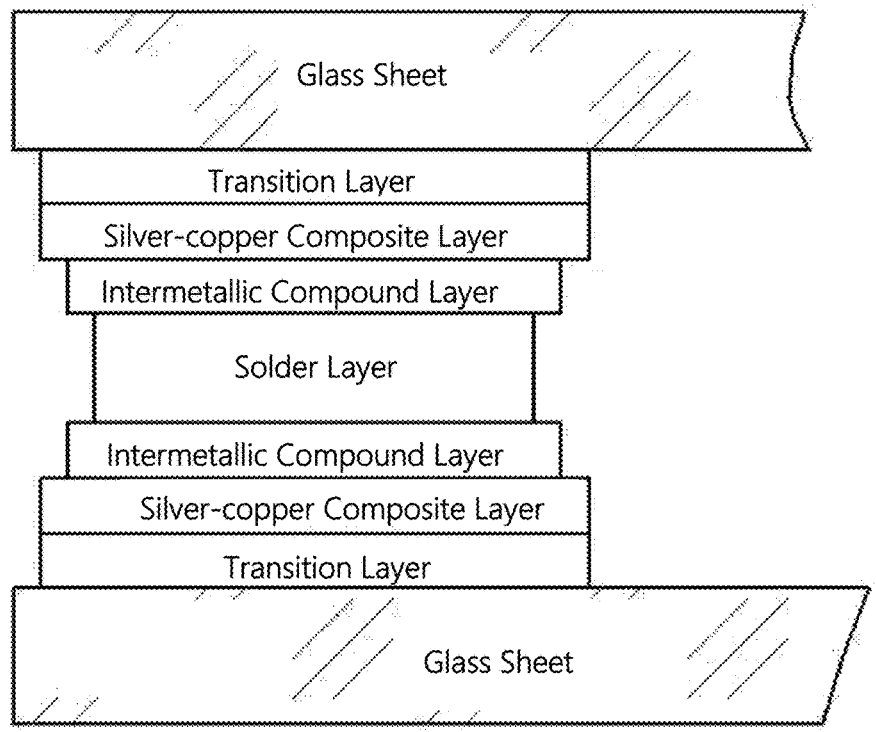
FIG. 3 is a schematic diagram of another exemplary Embodiment 2.

As FIG. 3 shows, the edge sealing structure 2 in another exemplary embodiment comprises a transition layer, silver-copper composite layer, intermetallic compound layer, solder layer, intermetallic compound layer, silver-copper composite layer, and transition layer stacked in that order. Among which, the metallized layer is a spongy skeleton structure formed through the sintering of metal paste, which is silver-coated copper paste. The solder layer is formed through the melting of low-temperature solder containing tin, which is the combination of tin and transition metal, and of tin and rare metal, including Sn—Ag—Bi—In, Sn—Ag—Bi—Cu—In—Ti, Sn—Ag—Bi—In—Ti, or Sn—Ag—Cu—In—Ti alloy.

The intermetallic compound layer is a tooth surface layer formed through the reaction between solder layer and silver-copper composite layer. The rugged tooth surface layer ensures that the silver-copper composite layer and solder are combined more firmly. The solder is filled in the pores of the spongy skeleton structure of silver-copper composite layer, rendering better air tightness. The intermetallic compound layer contains one of or the combination of $Ag_3Sn$, $AgZn$, and $In_3Sn$. The silver-copper composite layer contains about 3-10% of glass phase. The solder soaks the region of the silver-copper composite layer not yet being wrapped by glass phase to realize airtight sealing.

The transition layer is formed by sintering the silver-coated copper paste on the surface of glass sheets, and contains metal transition layer wrapping silver particles and copper particles. There are silver oxide transition layer and copper oxide transition layer with net structure in silver particle and copper particle skeletons of metal transition layer. In the process of sintering, silver-coated copper paste is sintered with glass sheets under capillary pressure. A transition layer comprises glass phase layer, silver oxide and copper oxide layers with net structure, which are mutually inclusive integrated structure through the synchronous sintering, so the transition layer has strong adhesion and excellent thermal shock resistance. Solder can be cooled quickly after soldering. During the tempering of glass sheets, metallic particles are firmly sintered with glass sheets by glass phase in sintering furnace. If damage occurs, it may only occur on the shallow surface of the glass sheet and does not influence performance of the glass.

Embodiment 3

Figure 4:
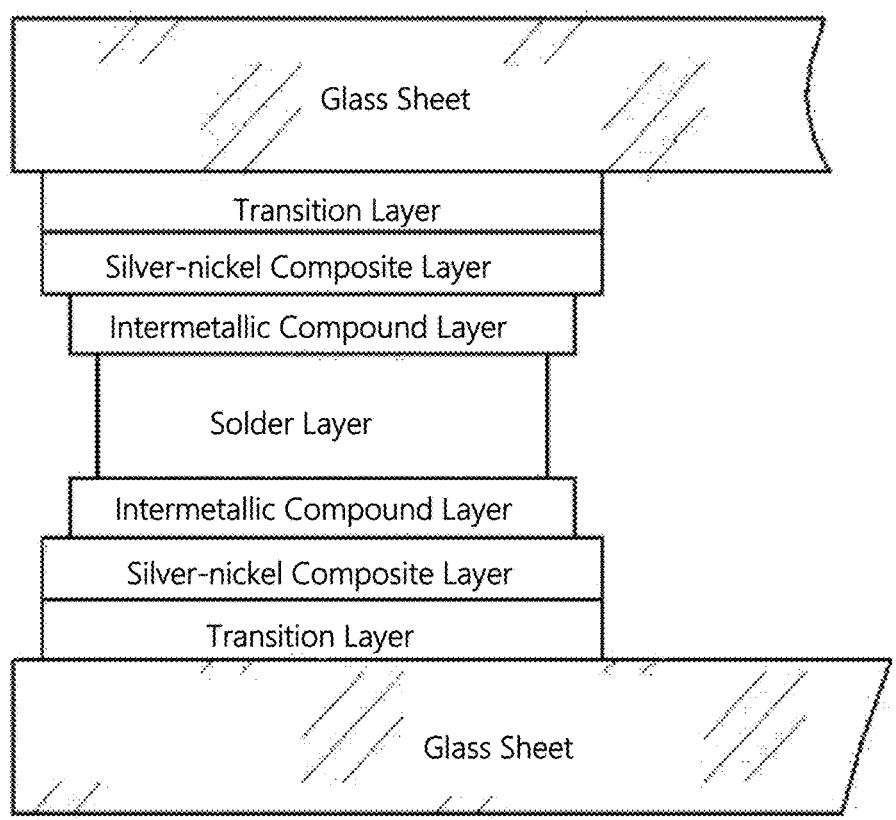
FIG. 4 is a schematic diagram of further another exemplary Embodiment 3.

As FIG. 4 shows, the edge sealing structure 2 in an exemplary embodiment comprises a transition layer, silver-nickel composite layer, intermetallic compound layer, solder layer, intermetallic compound layer, silver-nickel composite layer, and transition layer stacked in that order. The metallized layer is a spongy skeleton structure formed through the sintering of a metal paste, and the metal paste is silver-coated nickel paste. The solder layer has low-temperature solder containing tin, which is the combination of tin, and transition metal and rare metal. The solder layer is Sn—Pb, Sn—Sb, Sn—Bi or Sn—Ag—Cu—Bi.

The intermetallic compound layer is a tooth surface layer formed through the reaction between solder layer and silver-nickel composite layer. The rugged tooth surface layer ensures that the silver layer and solder are combined more firmly. The solder fills the pores of the spongy skeleton structure of silver-nickel composite layer, rendering better air tightness. The intermetallic compound layer contains $Ag_3Sn$. The silver-nickel composite layer contains about 3-10% of glass phase. The solder soaks the region of the silver-nickel composite layer not yet being wrapped by glass phase to realize airtight sealing.

The transition layer is formed by sintering the silver-coated nickel paste on the surface of glass sheets and contains metal transition layer wrapping silver particles and nickel particles. There are silver oxide transition layer and nickel oxide transition layer with net structure in silver particle and nickel particle skeletons of the metal transition layer. During sintering, silver-coated nickel paste is sintered with glass sheets under capillary pressure. A transition layer comprises glass phase layer, silver oxide and nickel oxide layers with net structure, which are mutually inclusive integrated structure through the synchronous sintering, so the transition layer has strong adhesion and excellent thermal shock resistance. Solder can be cooled quickly after soldering.

In this present disclosure, silver paste adopted may also contain one of or the combination of several kinds of rare metal, transition metal and precious metal, and form metallized layers such as silver-titanium composite layer and silver-hafnium-rhenium composite layer. Silver-coated copper paste adopted may also contain one of or the combination of several kinds of rare metal, transition metal and precious metal, and form metallized layers such as silver-indium-copper composite layer, silver-titanium-copper composite layer, and silver-rhenium-copper composite layer. Silver-coated nickel paste adopted may contain one of or the combination of several kinds of rare metal, transition metal and precious metal, and form metallize layers such as silver-manganese-nickel composite layer, silver-hafnium-nickel composite layer, and silver-molybdenum-nickel composite layer.

The embodiment in this present disclosure provides a tempered vacuum glass, and it relates to an edge sealing structure that can satisfy edge sealing and airtight requirements of the vacuum glass. The vacuum glass provides the advantages of a tempered glass and a vacuum glass and ensures the mechanical performance, durability and weathering resistance of edge-sealing structure of the tempered vacuum glass.

The invention claimed is:
1. A tempered vacuum glass, comprising:
at least two glass sheets arranged parallel to each other, at least one of the at least two glass sheets being tempered glass;
surrounding edges of adjacent glass sheets being sealed by an edge sealing structure; and
support members placed in an array between the adjacent glass sheets to form a vacuum space;
wherein:
the edge sealing structure is a metallic edge-sealing structure formed by sealing the surrounding edges of the adjacent glass sheets with metal;
the edge sealing structure comprises a first transition layer, a first metallized layer, a first intermetallic compound layer, a solder layer, a second intermetallic compound layer, a second metallized layer, and a second transition layer stacked in that order;
the first and second metallized layers are in a spongy skeleton structure formed by sintering of a first metal paste;
the first and second intermetallic compound layers comprise intermetallic compound formed by solder in the solder layer and the first metal paste, wherein the solder is heated and melt to fill pores of the spongy skeleton structure on the first and second metallized layers' surfaces adjacent to the solder layer; and
the first and second transition layers are formed by sintering a second metal paste on the adjacent glass sheets, and contain a glass phase layer including metallic particles and a metal oxide layer,
wherein the metal oxide layer and the glass phase layer form a mutually inclusive integrated structure.

2. A tempered vacuum glass according to claim 1, wherein the solder layer is formed through melting of a low-temperature solder containing tin, and the low-temperature solder containing tin is a combination of tin and one or more transition metals, rare metals, or precious metals.

3. A tempered vacuum glass according to claim 2, wherein material of the solder layer is Sn—Ag—Cu, Sn—Au, Sn—Pb, Sn—Ag, Sn—Cu, Sn—Zn, Sn—Bi, Sn—Sb, Sn—Ag—Cu—Bi, Sn—Ag—Bi—In—Ti, Sn—Ag—Bi—In, Sn—Ag—Cu—In—Ti, or Sn—Ag—Bi—Cu—In—Ti alloy.

4. A tempered vacuum glass according to claim 1, wherein the first metal paste or the second metal paste is a silver paste, a silver-coated copper paste, or a silver-coated nickel paste, which contains one or more rare metals, transition metals, or precious metals.

5. A tempered vacuum glass according to claim 1, wherein each joint surface of the first and second intermetallic compound layers and the solder layer has a rugged tooth structure.

6. A tempered vacuum glass according to claim 5, wherein the first and second intermetallic compound layer contain one or more Ag3Sn, AgZn, or In3Sn.

7. A tempered vacuum glass according to claim 1, wherein the first and second intermetallic compound layer contain about 3% to 10% of glass phase.

8. A tempered vacuum glass according to claim 1, wherein at least one of the at least two glass sheets includes a pump-out hole, and a cap liner that is used to seal the pump-out hole.

9. A tempered vacuum glass according to claim 1, wherein outer sides of the edge sealing structure are provided with a secondary peripheral sealing structure including sealant, resin, or plastic.

* * * * *